United States Patent
Faure

[15] 3,706,362
[45] Dec. 19, 1972

[54] TELESCOPIC HYDRAULIC DAMPER

[72] Inventor: Denis Marie Faure, Saint Prix, France

[73] Assignee: Chrysler France, Paris, France

[22] Filed: May 5, 1970

[21] Appl. No.: 34,731

[30] Foreign Application Priority Data

May 8, 1969 France..................................6914868
Sept. 26, 1969 France..................................6933007

[52] U.S. Cl. ...............188/282, 137/493.8, 137/512, 188/317, 188/320, 188/322
[51] Int. Cl. ...............................................F16f 9/34
[58] Field of Search......188/280, 282, 315, 317, 320, 188/322; 137/493.8, 493.9, 512.1, 512

[56] References Cited

UNITED STATES PATENTS

| | | | |
|---|---|---|---|
| 2,609,893 | 9/1952 | Glassford | 188/315 |
| 2,670,814 | 3/1954 | Ball | 188/315 |
| 2,717,058 | 9/1955 | Brundrett | 188/320 |
| 2,941,629 | 6/1960 | Rohacs | 188/320 |
| 3,321,051 | 5/1967 | Heckethorn | 188/315 |
| 3,302,756 | 2/1967 | McIntyre | 188/322 X |

FOREIGN PATENTS OR APPLICATIONS

| | | | |
|---|---|---|---|
| 563,802 | 1/1958 | Belgium | 188/280 |
| 648,932 | 1/1951 | Great Britain | 188/317 |
| 1,116,905 | 2/1956 | France | 188/322 |

*Primary Examiner*—George E. A. Halvosa
*Attorney*—Steinberg & Blake

[57] ABSTRACT

A telescopic hydraulic shock-absorber comprises inner and outer cylinders provided at their head and foot ends with respective closure members formed with conical bearing surfaces for self-centering of said cylinders. The annular head closure member of the inner cylinder guides the rod of a piston through which are arranged, for each direction of motion, two valves opening at different pressures. The annular foot closure member of the inner cylinder carries coaxially arranged valve means, controlling selectively the flow of make-up liquid to and from said outer cylinder.

3 Claims, 14 Drawing Figures

TELESCOPIC HYDRAULIC DAMPER

The present invention relates generally to telescopic hydraulic dampers or shock absorbers intended in particular for the equipment of automotive vehicles, and concerns more particularly dampers of the type comprising two coaxial cylinders, the central cylinder filled with a liquid communicating through the medium of valves with the outer cylinder, which contains reserve liquid for compensating the variations of the displacement of the rod of the piston sliding in the central cylinder.

Dampers of this type, which have long been known, therefore have, in addition to the piston valves determining the damping characteristics in extension and in compression, a dual valve controlling the flow of liquid between the outer and inner cylinders, the said dual valve being usually arranged at the foot of the damper. Dampers of this already known type have however the drawback of being relatively complicated and costly; in particular, it is difficult to obtain satisfactory damping characteristics by means of sturdy and low-cost valves. Furthermore and as a rule, their structure does not allow to mount dampers of one and the same kind on vehicles of different types, unless they are subjected to delicate and costly modifications.

The invention has for its object to obviate the above mentioned drawbacks of the prior known dampers of the type concerned, by providing a damper having a simple, sturdy and low-cost structure and capable of being readily adapted to the mounting of the damper on vehicles of different types and/or to different damping characteristics.

To this end, the damper according to the invention is characterized in that the head and the foot of the central cylinder are closed by annular members, made for instance from sintered materials, provided with substantially conical bearing surfaces allowing the self-centering thereof on closing end-pieces of the outer cylinder, the head member ensuring the guiding of the piston rod while the foot member carries, in coaxial arrangement, the valves controlling the communication between the outer and inner cylinders.

Advantageously, and according to another feature of the invention, the head and foot members are provided on their outer periphery with grooves passing through the said bearing surfaces and preferably distributed in circular symmetry.

It obviously appears from the aforesaid characteristics that the invention enables to obtain, by simple means, a precise centering of the piston in the cylinder, which condition is necessary to ensure reliable fluid-tightness, and therefore to obtain perfectly controlled damping characteristics. The peripheral grooves of the head and foot members, owing to their distribution, allow free circulation of the liquid without hindrance to reliable centering of the damper elements and without weakening the head and foot members, the sturdiness of which determines that of the damper; furthermore, this arrangement of the flow of liquid allows to readily manufacture the head and foot members of the damper through moulding or sintering.

According to another feature of the damper of the invention the flow of liquid through the central opening of the annular foot member is controlled in both directions by two valves carried by one and the same axial stem and urged in opposite directions by differently calibrated springs.

Thus, simple replacement of the single movable system of the damper foot valve enables to readily adapt it to different operating conditions.

According to still another feature of the damper of the invention, the piston is provided in parallel with two valves opening at different pressures in each direction of flow of the liquid.

This arrangement enables to obtain different damping characteristics, adapted for instance for the travel of a vehicle on a highway or in town; on the other hand, this arrangement eliminates any subjection to centering or mounting accuracy without prejudice to the closing fluid-tightness.

The invention will be better understood and other objects, characteristics and advantages thereof will appear as the following description proceeds, with reference to the appended drawings given solely by way of example illustrating one form of embodiment of the invention and wherein.

Figure 7:
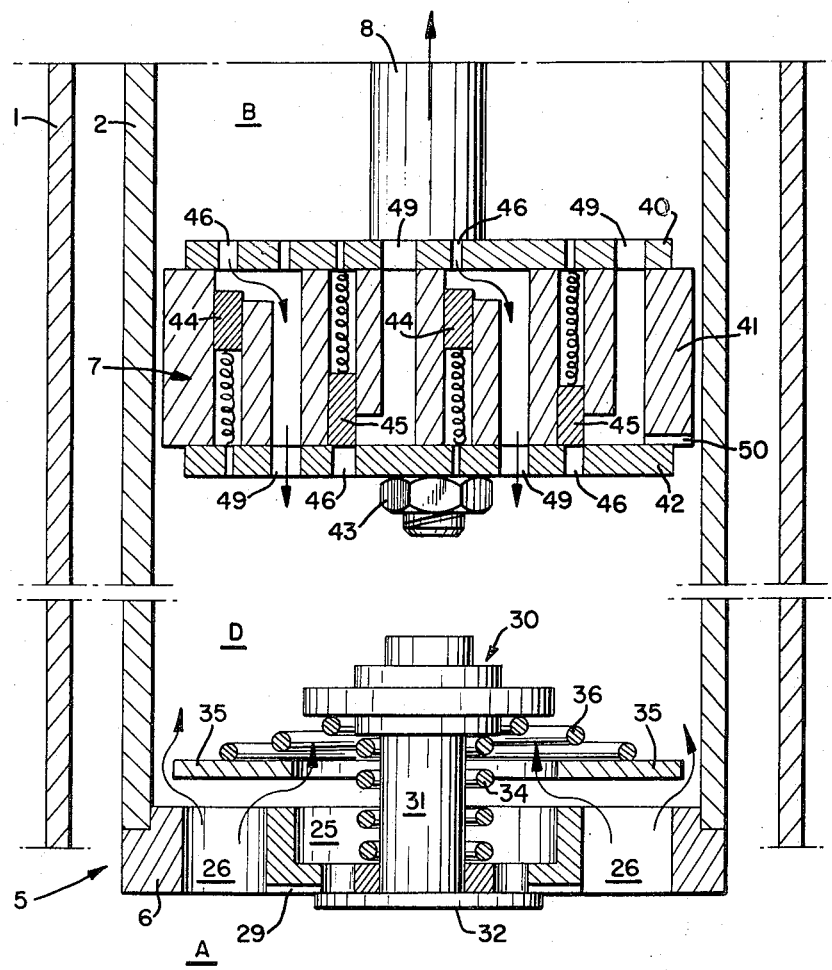
Figure 8:
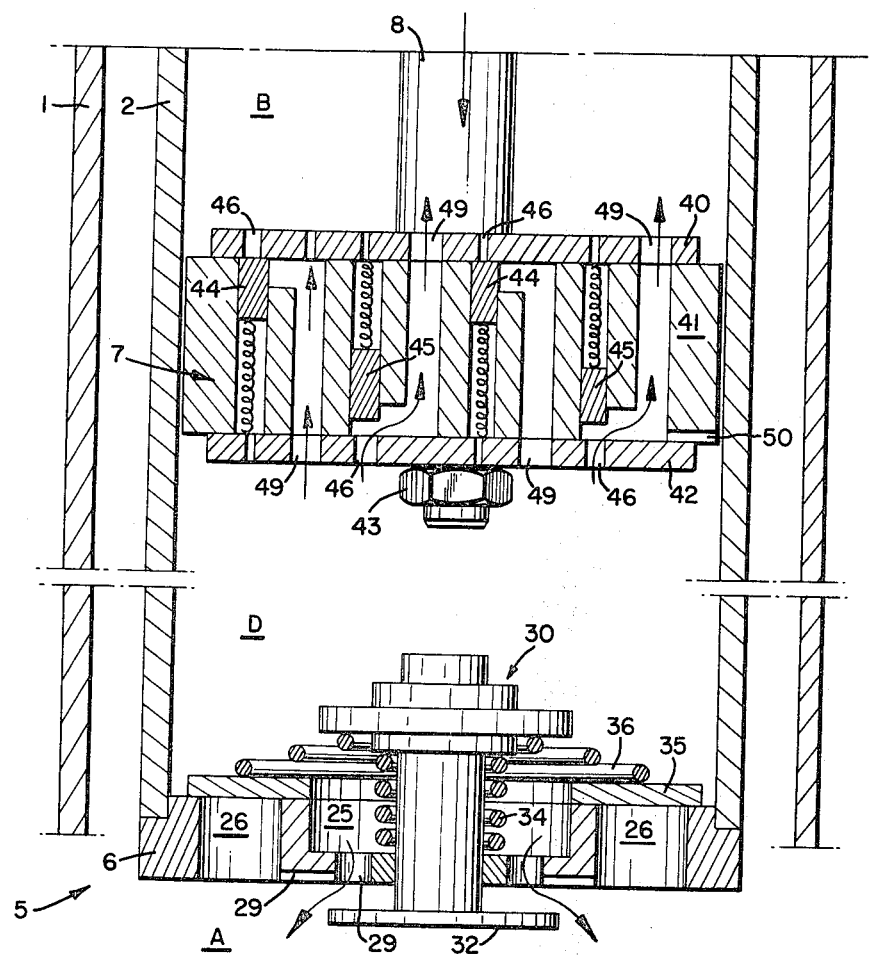
Figure 9:
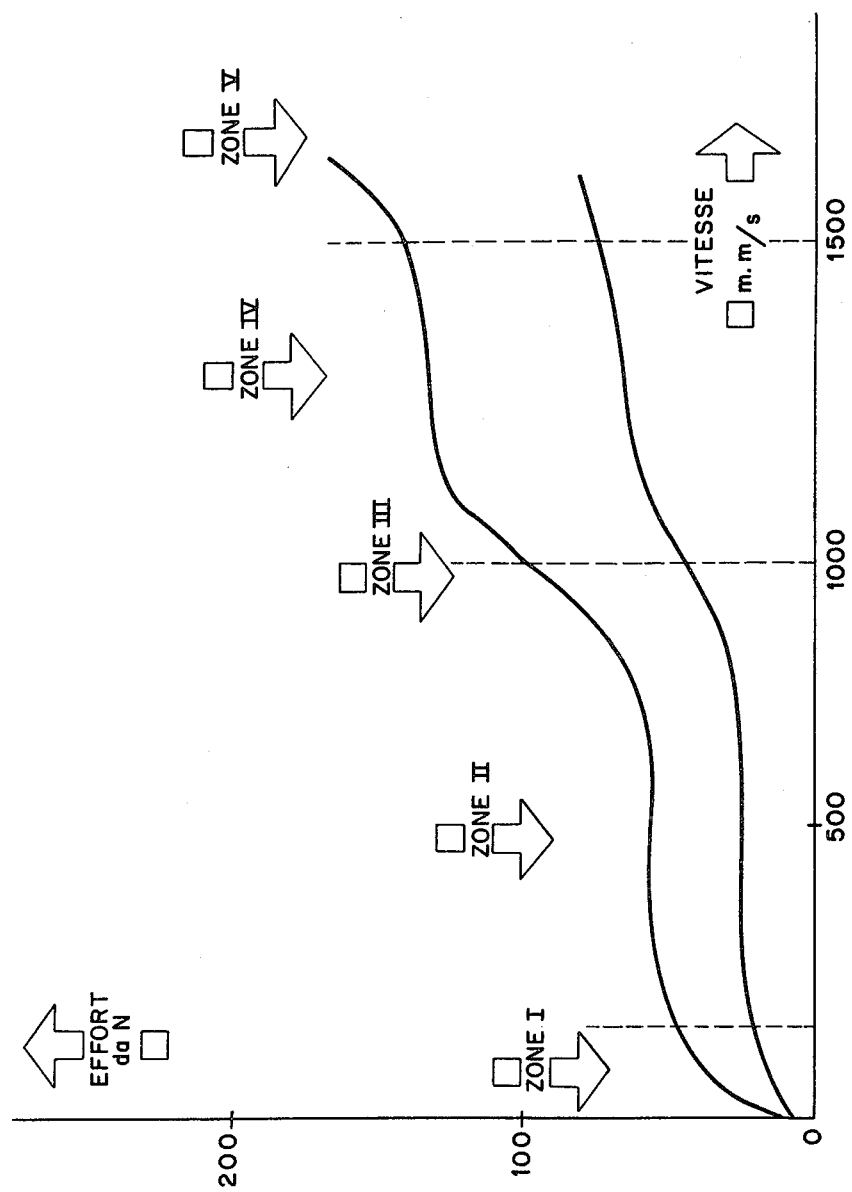
Figure 10:
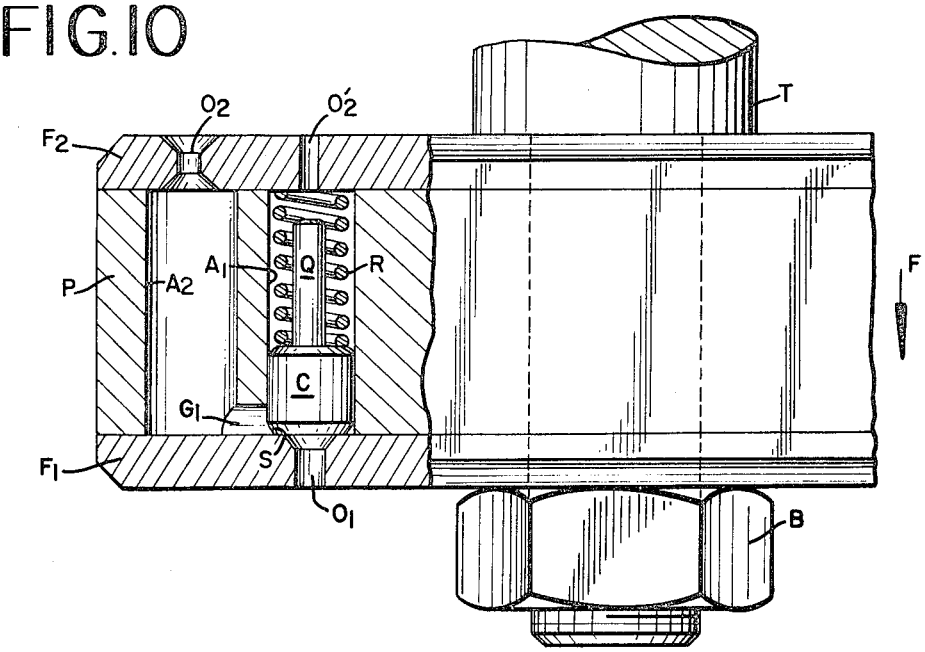
Figure 11:
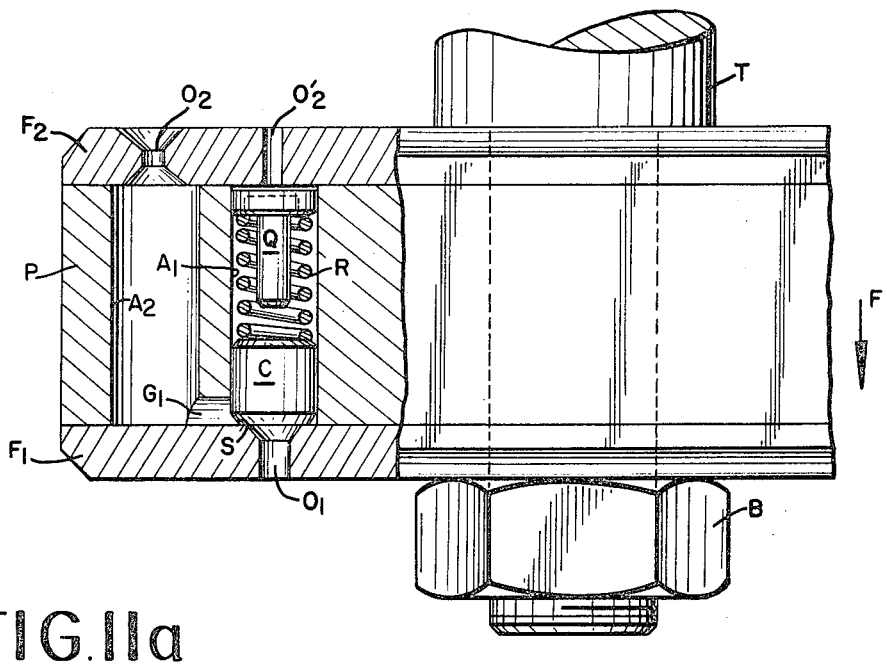
Figure 11A:
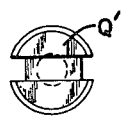

FIGS. 7 and 8 diagrammatically illustrate the operation of the damper during the extension and the thereof compression, respectively:

FIG. 9 is a diagram illustrating the operating characteristics of the damper; and FIGS. 10 to 13 show, each in lateral and partially sectional view, four forms of embodiment of the damper piston, wherein FIG. 11a illustrates separately one of the members incorporated in the piston of FIG. 11.

Figure 1:
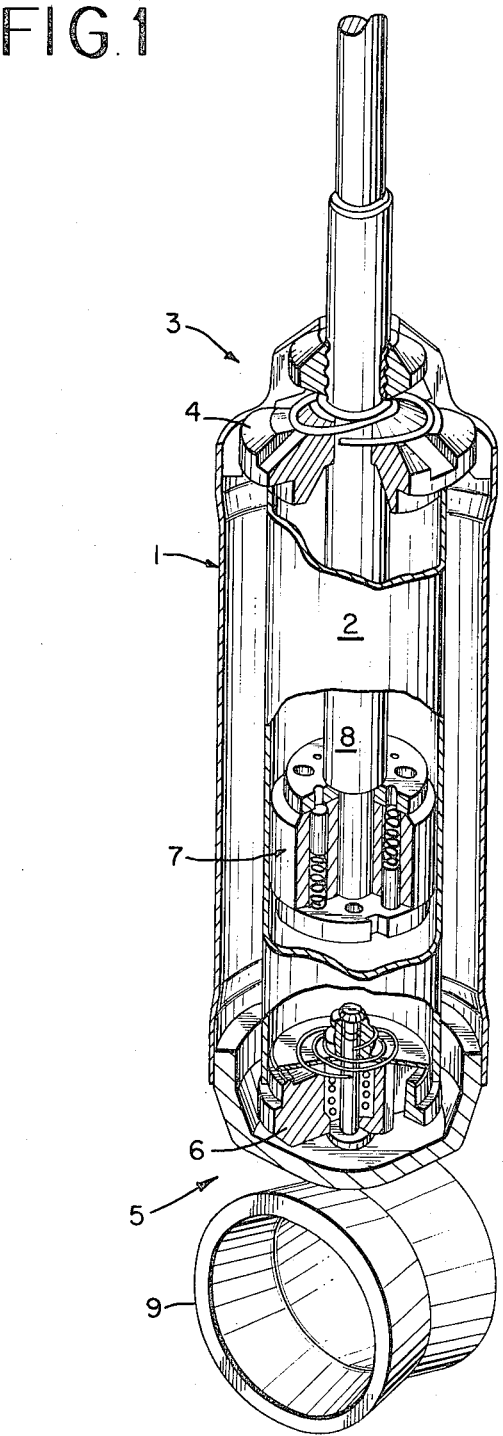
FIG. 1 is a perspective view, with parts broken away, of a damper according to the invention.

The damper described hereinafter as an example of carrying out the invention and a general view of which is given in FIG. 1, comprises essentially, as in other dampers of the same type, an outer cylinder 1 and a coaxial inner cylinder 2 assembled on the one hand to the upper portion or head 3 of the damper by means of a guide 4 and, on the other hand, to the lower portion or foot 5 of the latter, by means of a foot valve body 6. In the inner cylinder 2 slides a piston 7 provided with valves, solid with a rod 8 sliding through the guide 4. The upper end of the rod 8 is secured, by means of a device known per se (not shown), to the chassis or to the body of the vehicle; the foot 5 of the damper carries an eye 9 or other member enabling it to be secured to a suspension element such as an axle or a vehicle wheel arm.

Figure 2:
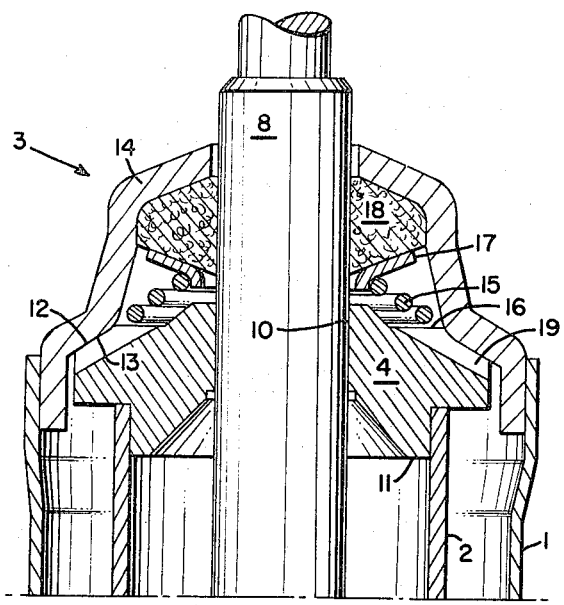
FIG. 2 is an axial sectional view of the damper head.
Figure 3:
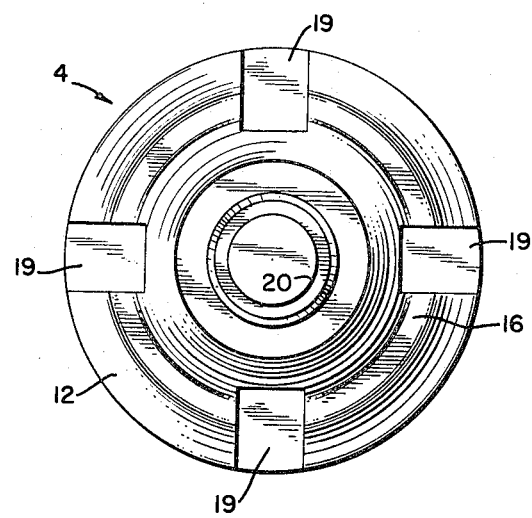
FIG. 3 is a plan view of the head member of the damper.

The mounting of the head 3 of the damper body and the configuration of the rod-guide 4 are clearly shown in FIGS. 2 and 3. The rod-guide 4 is constituted by a member of annular general shape, made for instance from sintered material, comprising a central bore 10 through which is guided the rod 8, and a concentric collar 11 formed on its lower face, enabling it to be fitted into the end of the inner tube 2; the opposite face of the rod-guide 4 is provided with a substantially conical peripheral bearing surface 12 engaging the corresponding inner surface 13 of a cap 14 closing the upper end of the outer cylinder 1, the assembly being secured by welding or any other means; it will be noted that the shape of the bearing surfaces 12 and 13 ensure the self-centering of the guide 4 in the cap 14. A taper helical spring 15 resting upon a plane annular bearing surface 16 of the rod-guide 4 exerts, through the medium of a bearing dish or washer 17, a pressure on the packing 18 housed in the cap 14. Lastly, as appears clearly in FIG. 3, the rod-guide 4 is provided on the periphery of its upper face with four radial slots 19 passing right through the conical bearing surface 12 so as to ensure free communication between the annular space defined between the cylinders 1 and 2 and the space comprised between the rod-guide 4, the cap 14 and the packing 18.

Figure 4:
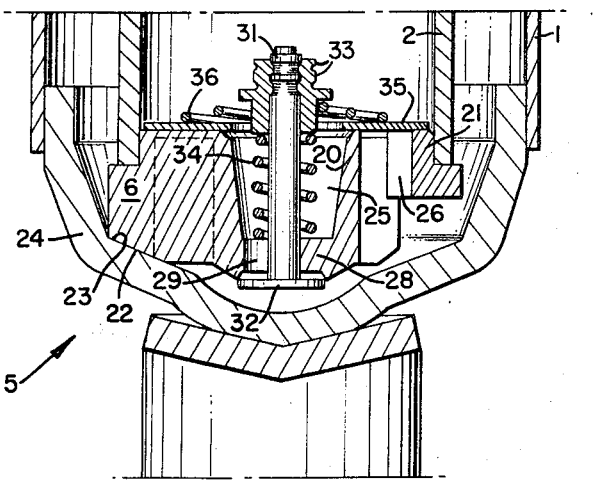
FIG. 4 is an axial sectional view of the damper foot.
Figure 5:
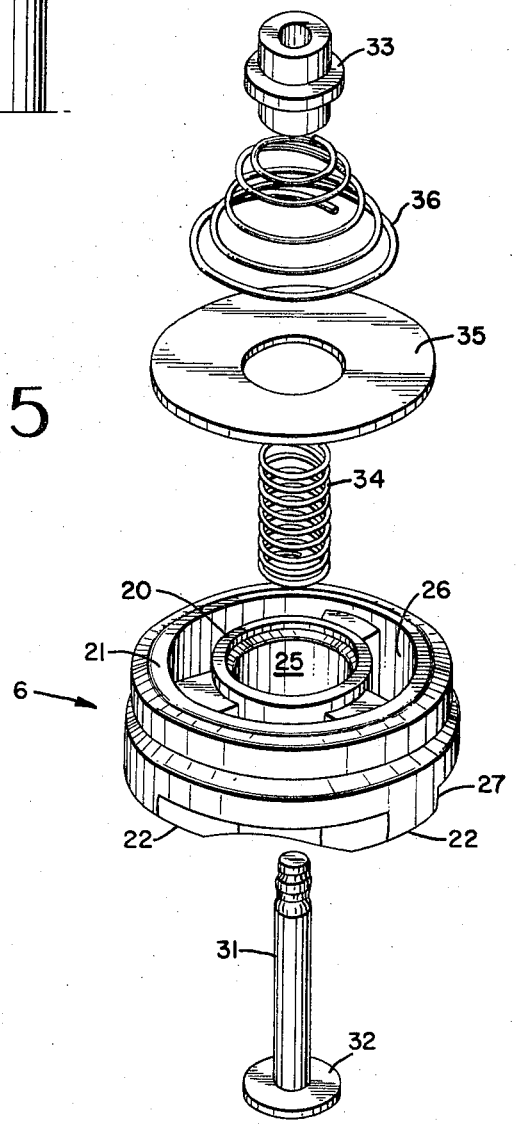
FIG. 5 is an exploded perspective view of the foot valve of the damper.

The mounting of the damper foot 5 and the arrangement of the foot valve are clearly shown in the sectional view of FIG. 4 and the exploded perspective view of FIG. 5. The body 6 of the foot valve is constituted by a member of annular general shape, provided with an inner sleeve 20 defining an axial passageway for the fluid and an outer sleeve 21 provided with a rabbet or the like enabling it to be fitted into the end of the central cylinder 2, the said sleeves being interconnected by three radial arms, each of which terminates with a bearing surface 22 engaging a conical surface corresponding provided on a cap 24 closing the end of the outer cylinder 1 so as to ensure the self-centering of the foot valve body 6 and therefore of the central cylinder 2 with respect to the outer cylinder 1. The configuration and mounting of the foot valve body 6 therefore allow the passage of the liquid from the inner space of the central cylinder 2 into the innerspace of the cap 24, on the one hand through the central orifice 25 and, on the other hand, through three radial orifices 26, and its passage from the inner space of the cap 24 into the annular space defined between the cylinders 1 and 2 by three peripheral paths 27 separated by the bearing surfaces 22 of the radial arms of the body.

These different flows of fluid are controlled by a single movable system forming a dual valve. This movable system comprises essentially a stem 31 carrying at its lower end an integral valve head 32 and at its upper end a stop 33 which is for instance set on; the stem 31. Stem 31 slides through a transverse partition 28 closing the lower end of the central sleeve 20; a spring 34 resting upon the said partition pushes the stop 33 upwardly so as to apply the valve head 32 onto a sealing seat formed on the lower face of the partition 28. The second valve 35 constituted by a simple ring is applied on the upper face of the valve body 6 by a taper helical spring 36 pressing against an outer collar of the stop 33, whose diameter is smaller than that of the central opening of the valve 35. The latter therefore closes the radial passageways 26 without interfering with the free circulation of the fluid through the axial path 25 which opens under the valve head 32 through one or several slots 29 provided in the partition.

Figure 6:
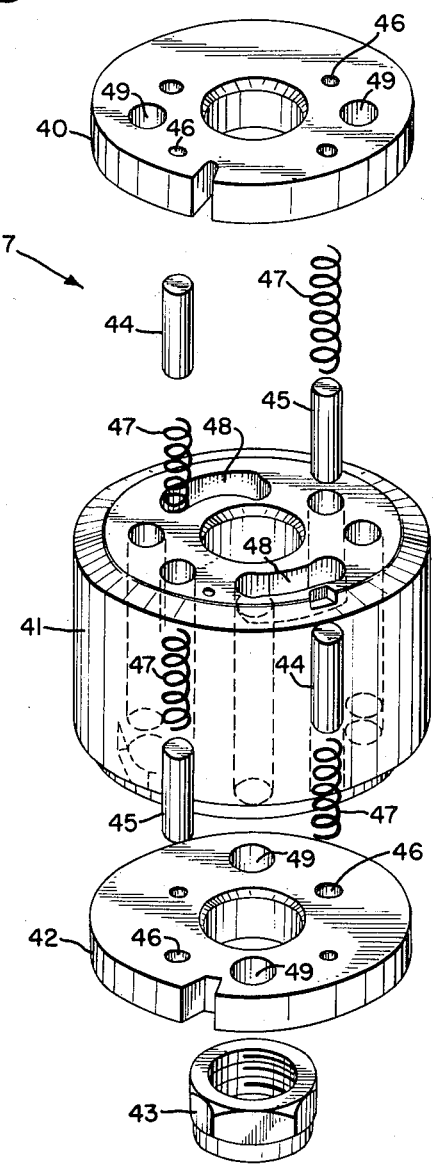
FIG. 6 illustrates the arrangement of the damper piston, in exploded perspective view.

The piston 7, an exploded perspective view of which is shown in FIG. 6, is essentially constituted by an upper annular end-plate 40 the central orifice of which bears upon a shoulder of the rod 8 (FIG. 1), a cylindrical body 41, made for instance from sintered material, mounted on the rod 8 and carrying the various elements of the valves, a lower annular end-plate 42 which is also slipped onto the rod 8, and lastly a clamping nut 43 screwed onto the threaded end of the rod 8. In the form of embodiment illustrated, the cylindrical piston body 41 carries four valves, i.e., two valves 45 acting during the compression of the damper, and two valves 44 acting in parallel during its extension. Each of these valves is simply constituted by a cylindrical member mounted slidingly in a longitudinal bore A1 of the piston body 41, the said cylindrical member bearing normally by one of its end faces against an orifice 46 of smaller diameter provided in one of the end plates 40, 42, under the action of the resilient pressure exerted by a spring 47 resting upon the other end-plate of the piston 7; curvilinear grooves 48 provided in the opposite faces of the piston body 41 make the bore A1 of each valve communicate with a parallel bore A2 in the piston body 41 opening through an orifice 49 provided in one of the end-plates of the piston 7. Further, the opposite end of each valve bore A1 opens, on the spring side, through a corresponding adjutage or orifice provided in the opposite end plate in order to avoid, during operation, the siezing of the valve by the oil contained in the portion of its bore located on the spring side. An equivalent escape path may be provided for instance by means of notches or slots made in the faces of the body 41 in order to make the valve bores communicate with the exterior.

According to an essential feature of the invention, and for reasons which will appear clearly from the following description of the operation of the damper, the two valves 44 or 45 of one and the same pair have different operating characteristics. Otherwise stated, the two valves 44 have different opening pressures and saturations, and it is so for the valves 45. These differences in characteristics are obtained simply by using differently calibrated springs 47 and orifices 46 having different diameters.

It is indeed a well known fact that the most advantageous damping curve for an automotive vehicle should include:

at low displacement speeds of the damping piston, a zone of rapid increase of the resisting efforts allowing to damp the lowest suspension frequencies while at the same time opposing the sloping of the vehicle when turning;

another zone having the appearance of a slightly sloping plateau for the damping of the vehicle body frequencies, thus favoring comfort in town;

and a last zone located at a higher level than the previous one, for the damping of the inherent frequencies of the non-suspended masses of the vehicle, thus favoring road-holding qualities.

The following description of the operation of the damper according to the invention will enable to understand how the latter allows to obtain a damping curve with the best possible configuration; the description will be made with reference to FIGS. 7 and 8 in which, for the sake of clarity, the four piston valves are shown in one and the same plane.

During the expansion or extension of the damper, the various members thereof occupy the relative positions shown in FIG. 7. At the foot of the damper, the expansion valve 35 opens whatever the displacement speed of the piston 7 may be, and admits a sufficient flow of liquid from the space A to the space D so as to ensure the compensation of the variations of displacement of the rod 8 of the piston 7; any cavitation is thus avoided. On the other hand, the liquid contained in the space B flows into the space D through the piston 7 under the following conditions.

At low speeds of the piston 7, the expansion valves 44 do not open, and the liquid can only flow through the escape path 50, which corresponds to zone I of the diagram of FIG. 9, in which the effortspeed curve displays a relatively abrupt slope. At a little higher piston speeds at least one of the expansion valves 44 opens subsequent to saturation of the escape orifices 50; the curve of FIG. 9 then displays a zone II which is favorable to travel in town, as already mentioned.

At still higher speeds of the piston 7, the flow through the calibrated passageway 46 tends to reach a saturation value, and this corresponds to the steep-shaped zone III of the curve of FIG. 9. When the saturation value of the passageway 46 is reached, the second expansion valve 44 opens and a plateau is again obtained in the effort-speed curve, i.e., the zone IV of the diagram of FIG. 9.

If the piston speed is still higher, a second threshold is reached, which corresponds to the sum of the saturations of the two passageways 46 associated with the expansion valves 44. The efforts therefore continue to increase (zone V of the curve of FIG. 9).

During the compression of the damper, the various members thereof take the relative positions shown in FIG. 8. In this case, the liquid flows from the space D to the space B through the escape orifices 50 and the valves 45 according to a cycle and an opening sequency similar to those described hereinabove: escape conditions, opening of the first valve, saturation, opening of the second valve, re-saturation.

On the other hand, the compression valve 32 of the damper foot is calibrated so as to oppose a certain resistance to a too rapid flow of the liquid from the space D to the space A and therefore to an increase of the displacement of the rod 8 penetrating into the damper, capable of preventing correct filling of the space D through the piston 7. However, the escape slot 29 (FIG. 4) ensures permanent communication between the spaces A and D.

There will not be described, in connection with FIGS. 10 to 13, various arrangements of the structure of the piston capable of improving the smoothness of operation of the damper, by limiting the raising of the valves and damping the displacements thereof and by restricting the outlet of the oil passageway associated with each valve; such arrangements are in addition advantageous in that they enable to reduce the blowing noise by modifying the flow without however modifying the knocking.

The damper pistons 7a to 7d, respectively shown in FIGS. 10 to 13, have the same general structure as the piston 7 and are likewise essentially formed of an annular member 41 confined between two annular end-plates 40, 42, the whole assembly being mounted on the piston rod 8 and maintained against a shoulder of the latter by means of a clamping bolt 43.

In the same manner as piston 7, such piston are provided, for each direction of flow of the liquid, with at least two valves in parallel opening at different pressures. For the sake of clarity of the drawings and convenient description, the arrangement of only one valve 45 is shown by the partial sectional view of each of FIGS. 10 to 13.

The valve 45 itself is constituted by a solid or massive cylindrical member mounted with easy slide fit in a bore A1 passing right through the central annular member 41 of the piston. A return spring 47 tends to maintain the valve 45 applied on its sealing seat S constituted by the periphery of an opening 46 of the end plate 42 which is coaxial with the bore A1 and has a smaller diameter than the latter. Thus, in the direction of displacement of the piston indicated by the arrow F, the liquid penetrating through the sealing seat S tends to push the valve 45 in the bore A1 behind the so-called front face of the annular member 41.

The front opening of the bore A1 communicates with the corresponding opening of a parallel bore A2 passing right through the annular member 41 through the medium of a passageway constituted by a groove 48 provided in the front face of the member 41, the solid end-plate 42 closing the wall of the said passageway and obturating the opening of the bore A2.

The opposite opening of the bore A2 on the rear face of the annular member 41 communicates with a coaxial opening 49 passing through the end-plate 40. As shown, this venturi-shaped opening constitutes a restriction the flow section of which is considerably smaller than that of the bore A2 but is advantageously substantially equal to that of the passageway 48. The presence of this restriction at the exit of the flow of liquid has a beneficial effect on the blowing noise as a result of the modifications which it introduces into the flow of liquid.

Figure 12:
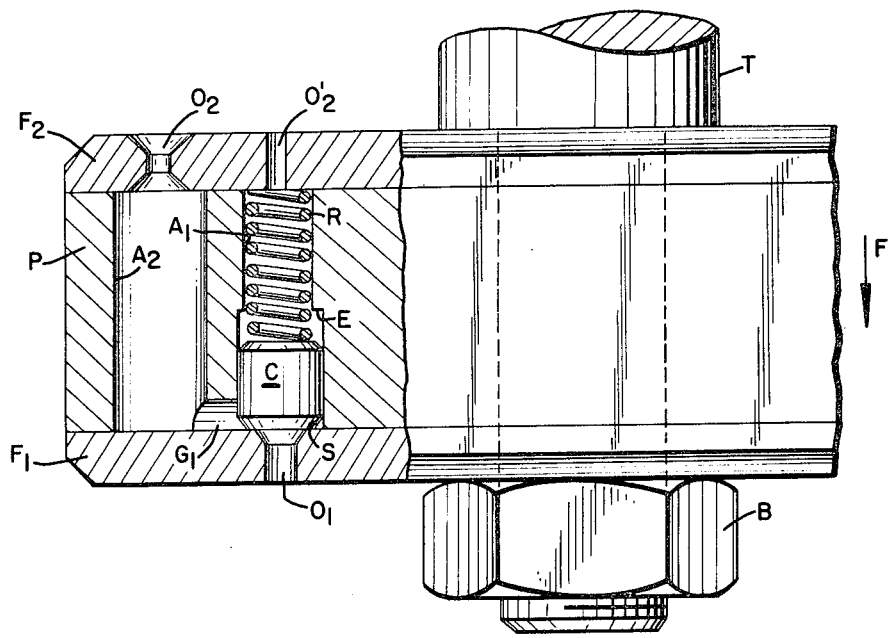
Figure 13:
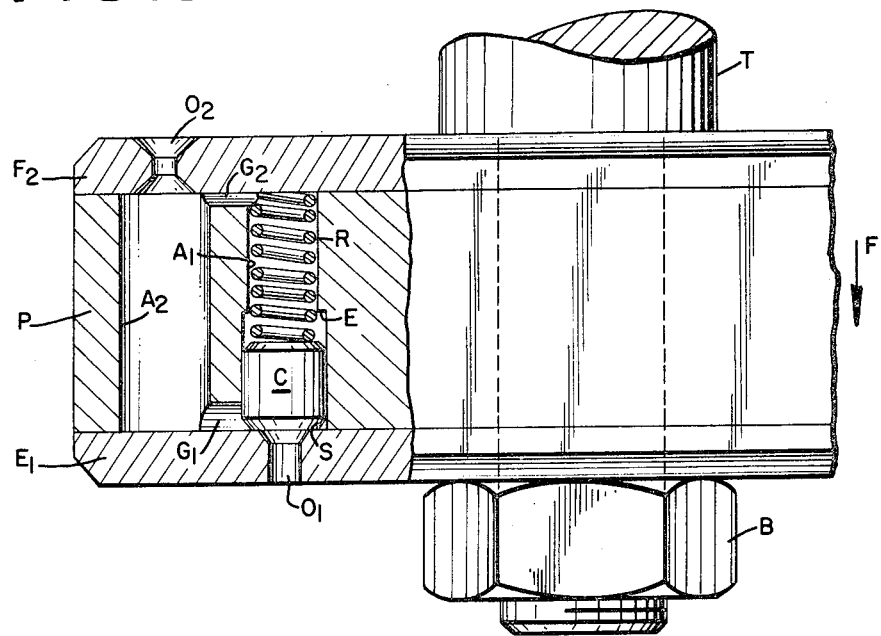

In the examples of embodiment illustrated in FIGS. 10, 11 and 12, the end-plate 40 is in addition provided, along the axis of the bore A1, with a second opening O of small relative section, through which the portion of the bore A1 located behind the valve 45 opens on the rear face of the piston, so that the liquid in the bore A1 does not interfere with the displacements of the valve. However, the relative small section of the orifice O restrains the passage of the liquid, and this leads to effective damping of the displacements of the valve. As shown in FIG. 13, the orifice O may be replaced by a passageway constituted by a groove G of small section connecting the rear openings of the bores A1 and A2.

Means are advantageously provided to limit the rising motion of the valve 45 in order to allow the saturation of the liquid inlet passageway and, therefore, the stabilization of the valve: as shown in FIG. 10, the valve 45 may be provided on its rear face with a tail or extension Q extending within its return spring 47 to a distance from the end-plate 40 corresponding to the required rising motion of the valve. In case of need, a diametral slot may be provided at the end of the tail Q of the valve, or the damping orifice O may be shifted laterally in order to avoid its obturation by the valve tail abutting against the end-plate 40. Inversely, as shown in FIG. 11, the rising motion of the valve may be limited by abutment against the end of a member Q' serving as a bearing for the spring 47 on the end-plate 40; in order to allow free passage of the liquid through the damping orifice O, the said member is provided for instance with a diametral cut or groove, as shown in FIG. 11a. Lastly, as shown in FIGS. 12 and 13, the rising motion of the valve 45 may be simply limited by an intermediate shoulder E of the bore A1.

It is quite obvious that the damping characteristics may be modified very economically by simply changing the calibration of the valve springs and modifying the diameter of the liquid inlet orifices, thus enabling to readily adapt one and the same damper to vehicles of different types. The opening sequence of the pairs of compression and expansion valves enables to obtain an advantageous damping curve, ensuring a judicious compromise between comfort and road-holding qualities under different conditions of travel of the vehicle. Lastly, the simplicity of manufacture of the various elements, the self-centering of the main members of the damper allow mass production thereof under particularly economical conditions.

Of course, the invention is by no means limited to the forms of embodiment described and illustrated, which have been given by way of example only; on the contrary, the invention comprises all the means constituting technical equivalents to those described and illustrated, as well as their combinations, carried out in the spirit of the following claims.

What is claimed is:

1. In a telescopic hydraulic shock-absorber, an outer cylinder having a pair of opposed head and foot end-pieces closing opposed ends of said outer cylinder and respectively having inner tapered surfaces, said head end-piece of said outer cylinder being formed with a central opening, an inner cylinder coaxially arranged within said outer cylinder and also having a pair of opposed head and foot end-pieces respectively closing opposed ends of said inner cylinder, said end-pieces of said inner cylinder having outer tapered surfaces respectively engaging said inner tapered surfaces of said opposed end-pieces of said outer cylinder for centering said inner cylinder within said outer cylinder, said opposed end-pieces of said outer cylinder respectively extending axially beyond said opposed end-pieces of said inner cylinder to define therewith a pair of opposed end chambers, and said inner cylinder being spaced inwardly from and surrounded by said outer cylinder between said end-pieces of said inner cylinder to define between said end-pieces of said inner cylinder an elongated annular space between said outer and inner cylinders, said end-pieces of said inner cylinder being formed at said exterior tapered surfaces thereof with radial grooves circumferentially distributed about the common axis of said cylinders to provide free communication between said end chambers and said elongated annular chamber between said cylinders, the head end-piece of said inner cylinder being formed with a central opening coaxially aligned with the central opening of the head end-piece of said outer cylinder, a piston rod extending through the latter openings into the interior of said inner cylinder and carrying in the latter a piston slidably engaging the inner surface of said inner cylinder, said head end-piece of said inner cylinder surrounding and slidably engaging said piston rod to form a rod-guide therefor, a packing situated in the head end chamber formed between the head end-pieces and surrounding said piston rod, a spring in said head end chamber engaging the head end-piece of said inner cylinder and pressing the packing against the head end-piece of said outer cylinder, the foot end-piece of said inner cylinder being formed with a central bore passing axially therethrough and with a plurality of additional axial bores passing therethrough and circumferentially distributed about said central axial bore of said foot end-piece of said inner cylinder, the latter central and axial bores providing communication between the interior of said inner cylinder beneath said piston and the foot end chamber defined between the foot end-pieces of said inner and outer cylinders, a central valve stem extending axially through said central bore of said foot end-piece of said inner cylinder and carrying at one end a valve member for closing said central bore and at an opposite end a collar, an inner spring acting on said collar and extending around said stem in said central bore of said foot end-piece of said inner cylinder for urging said valve member to a closed position at one end face of said foot end-piece of said inner cylinder, an annular valve plate engaging an opposed end face of said foot end-piece of said inner cylinder and having a closed position covering said additional axial bores, and an outer spring of tapered configuration engaging said collar and said annular valve plate for urging the latter to a closed position closing said additional axial bores of said foot end-piece of said inner cylinder, said inner and outer springs thus urging said valve member and valve plate in opposed directions against opposed end faces of said foot end-piece of said inner cylinder and respectively being differently calibrated to provide for selective control of liquid flow through said central bore, on the one hand, and said additional axial bores, on the other hand, of said foot end-piece of said inner cylinder in response to movement of said piston in different directions, respectively, said piston carrying a pair of piston valve means one of which includes a pair of valve units which are differently calibrated for providing liquid flow through said piston from one side to the other side thereof in response to different pressures during displacement of said piston in said inner cylinder in one direction and the other of which includes a pair of differently calibrated valve units for providing liquid flow through said piston from the other to said one side thereof in response to different pressures during movement of said piston in an opposite direction in said inner cylinder, said head and foot end-pieces of said inner cylinder being in the form of sintered bodies, said piston including an intermediate body and a pair of end plates engaging said intermediate body, said intermediate body also being in the form of a sintered body, each valve unit including a pair of bores extending axially through said intermediate body and a pair of openings in each endplate registering with the latter pair of bores, a cylindrical valve body in one of said bores of each valve unit, a spring in said one bore of each valve unit urging said cylindrical body to a closed position engaging an opening of an end plate, said axial bores of each valve unit communicating with each other next to the end plate toward which said cylindrical valve body is urged by said spring which acts on said cylindrical valve body, so that when the latter is displaced to an open position in opposition to the latter spring liquid will flow past the cylindrical valve body to that one of the bores of each valve unit which does not contain the cylindrical valve body and out through an opening in an opposed end plate which registers with the latter bore which does not contain the cylindrical valve body, and said intermediate body of said piston being formed with a permanently open cutout communicating with at least one of said bores of one of said valve units which does not contain a cylindrical valve body to provide a permanently open path of fluid flow through said piston, the different springs of each piston valve means being differently calibrated.

2. In a telescopic hydraulic shock-absorber, an outer cylinder having a pair of opposed head and foot end-pieces closing opposed ends of said outer cylinder and respectively having inner tapered surfaces, said head end-piece of said outer cylinder being formed with a central opening, an inner cylinder coaxially arranged within said outer cylinder and also having a pair of opposed head and foot end-pieces respectively closing opposed ends of said inner cylinder, said end-pieces of said inner cylinder having outer tapered surfaces respectively engaging said inner tapered surfaces of said opposed end-pieces of said outer cylinder for centering said inner cylinder within said outer cylinder, said opposed end-pieces of said outer cylinder respectively extending axially beyond said opposed end-pieces of said inner cylinder to define therewith a pair of opposed end chambers, and said inner cylinder being spaced inwardly from and surrounded by said outer cylinder between said end-pieces of said inner cylinder to define between said end-pieces of said inner cylinder an elongated annular space between said outer and inner cylinders, said end-pieces of said inner cylinder being formed at said exterior tapered surfaces thereof with radial grooves circumferentially distributed about the common axis of said cylinders to provide free communication between said end chambers and said elongated annular chamber between said cylinders, the head end-piece of said inner cylinder being formed with a central opening coaxially aligned with the central opening of the head end-piece of said outer cylinder, a piston rod extending through the latter openings into the interior of said inner cylinder and carrying in the latter a piston slidably engaging the inner surface of said inner cylinder, said head end-piece of said inner cylinder surrounding and slidably engaging said piston rod to form a rod-guide therefor, a packing situated in the head end chamber formed between the head end-pieces and surrounding said piston rod, a spring in said head end chamber engaging the head end-piece of said inner cylinder and pressing the packing against the head end-piece of said outer cylinder, the foot end-piece of said inner cylinder being formed with a central bore passing axially therethrough and with a plurality of additional axial bores passing therethrough and circumferentially distributed about said central axial bore of said foot end-piece of said inner cylinder, the latter central and axial bores providing communication between the interior of said inner cylinder beneath said piston and the foot end chamber defined between the foot end-pieces of said inner and outer cylinders, a central valve stem extending axially through said central bore of said foot end-piece of said inner cylinder and carrying at one end a valve member for closing said central bore and at an opposite end a collar, an inner spring acting on said collar and extending around said stem in said central bore of said foot end-piece of said inner cylinder for urging said valve member to a closed position at one end face of said foot end-piece of said inner cylinder, an annular valve plate engaging an opposed end face of said foot end-piece of said inner cylinder and having a closed position covering said additional axial bores, and an outer spring of tapered configuration engaging said collar and said annular valve plate for urging the latter to a closed position closing said additional axial bores of said foot end-piece of said inner cylinder, said inner and outer springs thus urging said valve member and valve plate in opposed directions against opposed end faces of said foot end-piece of said inner cylinder and respectively being differently calibrated to provide for selective control of liquid flow through said central bore, on the one hand, and said additional axial bores, on the other hand, of said foot end-piece of said inner cylinder in response to movement of said piston in different directions, respectively, said piston carrying a pair of piston valve means one of which includes a pair of valve units which are differently calibrated for providing liquid flow through said piston from one side to the other side thereof in response to different pressures during displacement of said piston in said inner cylinder in one direction and the other of which includes a pair of differently calibrated valve units for providing liquid flow through said piston from the other to said one side thereof in response to different pressures during movement of said piston in an opposite direction in said inner cylinder, said head and foot end-pieces of said inner cylinder being in the form of sintered bodies, said piston including an intermediate body and a pair of end plates engaging said intermediate body, said intermediate body also being in the form of a sintered body, each valve unit including a pair of bores extending axially through said intermediate body and a pair of openings in each end plate registering with the latter pair of bores, a cylindrical valve body in one of said bores of each valve unit, a spring in said one bore of each valve unit urging said cylindrical body to a closed position engaging an opening of an end plate, said axial bores of each valve unit communicating with each other next to the end plate toward which said cylindrical valve body is urged by said spring which acts on said cylindrical valve body, so that when the latter is displaced to an open position in opposition to the latter spring liquid will flow past the cylindrical valve body to that one of the bores of each valve unit which does not contain the cylindrical valve body and out through an opening in an opposed end plate which registers with the latter bore which does not contain the cylindrical valve body, and said intermediate body of said piston being formed with a permanently open cutout communicating with at least one of said bores of one of said valve units which does not contain a cylindrical valve body to provide a permanently open path of fluid flow through said pistons, the bores of each end plate which are closed by the cylindrical valve bodies of each piston valve means being of different diameters.

3. In a telescopic hydraulic shock-absorber, an outer cylinder having a pair of opposed head and foot end pieces closing opposed ends of said outer cylinder and respectively having inner tapered surfaces, said head end-piece of said outer cylinder being formed with a central opening, an inner cylinder coaxially arranged within said outer cylinder and also having a pair of opposed head and foot end-pieces respectively closing opposed ends of said inner cylinder, said end-pieces of said inner cylinder having outer tapered surfaces respectively engaging said inner tapered surfaces of said opposed end-pieces of said outer cylinder for centering said inner cylinder within said outer cylinder, said opposed end-pieces of said outer cylinder respectively extending axially beyond said opposed end-pieces of said inner cylinder to define therewith a pair of opposed end chambers, and said inner cylinder being spaced inwardly from and surrounded by said outer cylinder between said end-pieces of said inner cylinder to define between said end-pieces of said inner cylinder an elongated annular space between said outer and inner cylinders, said end-pieces of said inner cylinder being formed at said exterior tapered surfaces thereof with radial grooves circumferentially distributed about the common axis of said cylinders to provide free communication between said end chambers and said elongated annular chamber between said cylinders, the head end-piece of said inner cylinder being formed with a central opening coaxially aligned with the central opening of the head end-piece of said outer cylinder, a piston rod extending through the latter openings into the interior of said inner cylinder and carrying in the latter a piston slidably engaging the inner surface of said inner cylinder, said head end-piece of said inner cylinder surrounding and slidably engaging said piston rod to form a rod-guide therefor, a packing situated in the head end chamber formed between the head end-pieces and surrounding said piston rod, a spring in said head end chamber engaging the head end-piece of said inner cylinder and pressing the packing against the head end-piece of said outer cylinder, the foot end-piece of said inner cylinder being formed with a central bore passing axially therethrough and with a plurality of additional axial bores passing therethrough and circumferentially distributed about said central axial bore of said foot end-piece of said inner cylinder, the latter central and axial bores providing communication between the interior of said inner cylinder beneath said piston and the foot end chamber defined between the foot end-pieces of said inner and outer cylinders, a central valve stem extending axially through said central bore of said foot end-piece of said inner cylinder and carrying at one end a valve member for closing said central bore and at an opposite end a collar, an inner spring acting on said collar and extending around said stem in said central bore of said foot end-piece of said inner cylinder for urging said valve member to a closed position at one end face of said foot end-piece of said inner cylinder, an annular valve plate engaging an opposed end face of said foot end-piece of said inner cylinder and having a closed position covering said additional axial bores, and an outer spring of tapered configuration engaging said collar and said annular valve plate for urging the latter to a closed position closing said additional axial bores of said foot end-piece of said inner cylinder, said inner and outer springs thus urging said valve member and valve plate in opposed directions against opposed end faces of said foot end-piece of said inner cylinder and respectively being differently calibrated to provide for selective control of liquid flow through said central bore, on the one hand, and said additional axial bores, on the other hand, of said foot end-piece of said inner cylinder in response to movement of said piston in different directions, respectively, said piston carrying a pair of piston valve means one of which includes a pair of valve units which are differently calibrated for providing liquid flow through said piston from one side to the other side thereof in response to different pressures during displacement of said piston in said inner cylinder in one direction and the other of which includes a pair of differently calibrated valve units for providing liquid flow through said piston from the other to said one side thereof in response to different pressures during movement of said piston in an opposite direction in said inner cylinder, said head and foot end-pieces of said inner cylinder being in the form of sintered bodies, said piston including an intermediate body and a pair of end plates engaging said intermediate body, said intermediate body also being in the form of a sintered body, each valve unit including a pair of bores extending axially through said intermediate body and a pair of openings in each end plate registering with the latter pair of bores, a cylindrical valve body in one of said bores of each valve unit, a spring in said one bore of each valve unit urging said cylindrical body to a closed position engaging an opening of an end plate, said axial bores of each valve unit communicating with each other next to the end plate toward which said cylindrical valve body is urged by said spring which acts on said cylindrical valve body, so that when the latter is displaced to an open position in opposition to the latter spring liquid will flow past the cylindrical valve body to that one of the bores of each valve unit which does not contain the cylindrical valve body and out through an opening in an opposed end plate which registers with the latter bore which does not contain the cylindrical valve body, and said intermediate body of said piston being formed with a permanently open cutout communicating with at least one of said bores of one of said valve units which does not contain a cylindrical valve body to provide a permanently open path of fluid flow through said piston, the opening in each end plate of said piston which registers with that one of the axial bores of each valve unit which does not contain the cylindrical body being of a venturi-shaped configuration.

* * * * *